Aug. 23, 1938. L. JAENICHEN 2,128,148
WEIGHING SCALE
Filed Feb. 3, 1936 5 Sheets-Sheet 2

INVENTOR.
Louis Jaenichen
BY
ATTORNEYS.

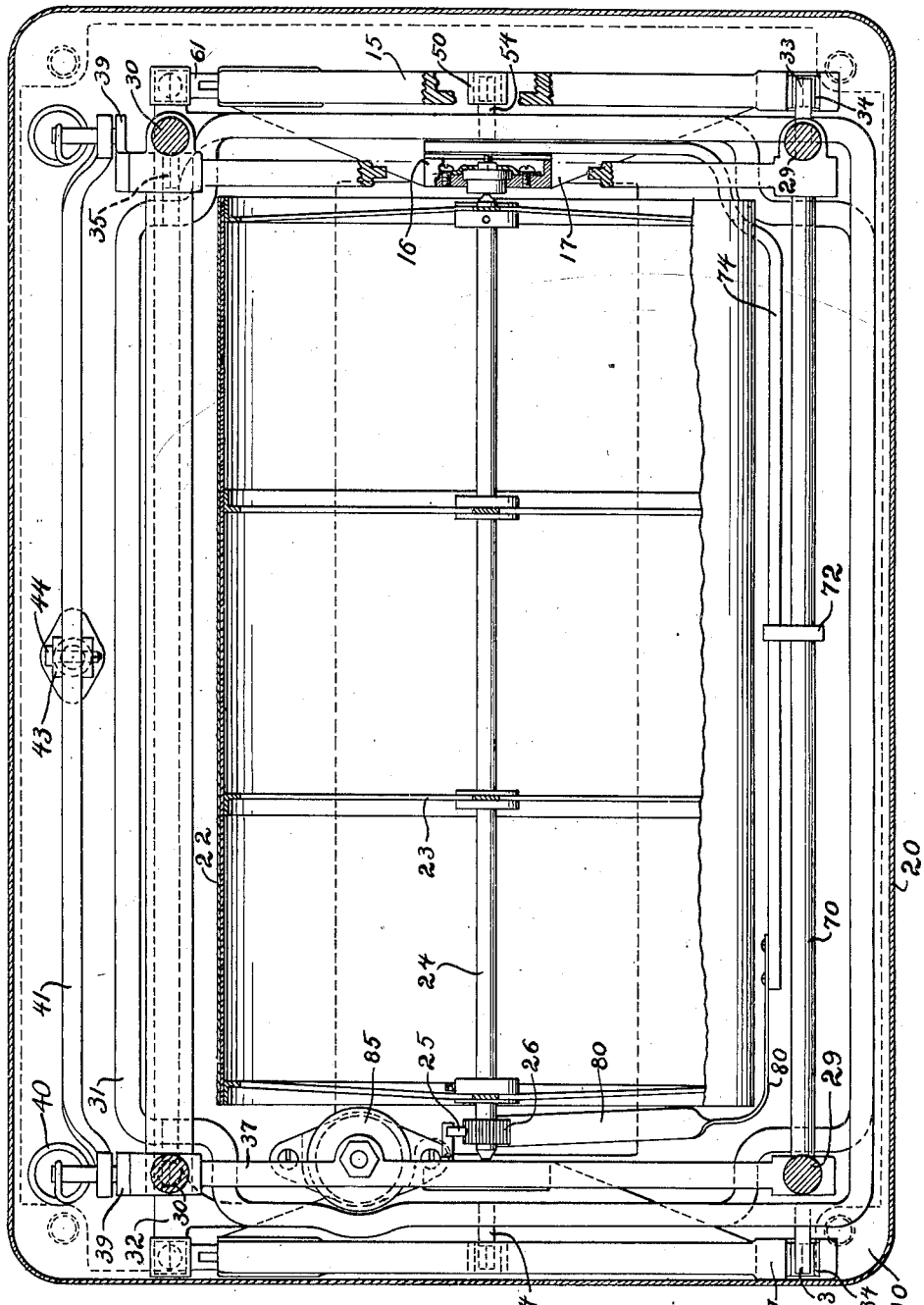

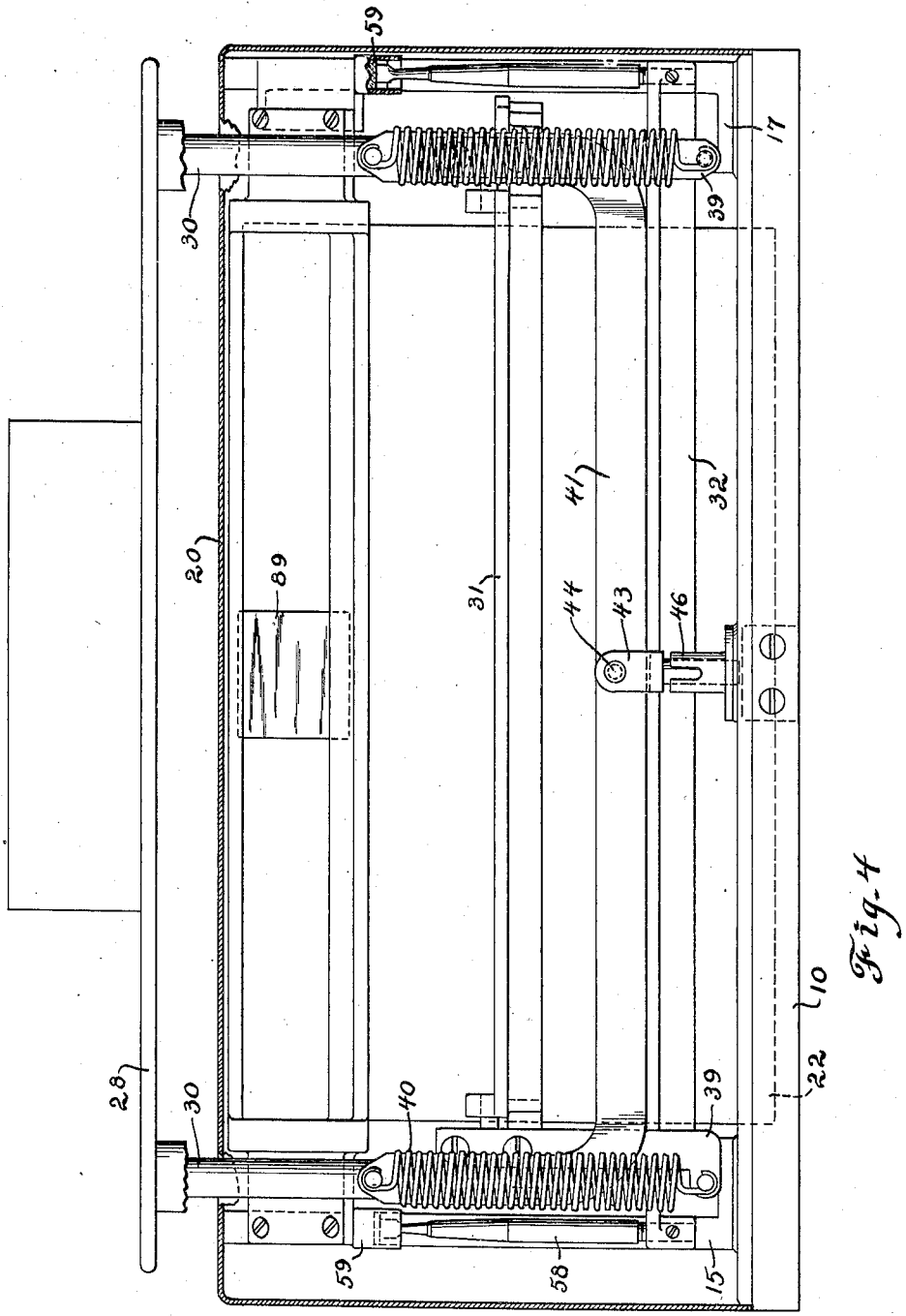

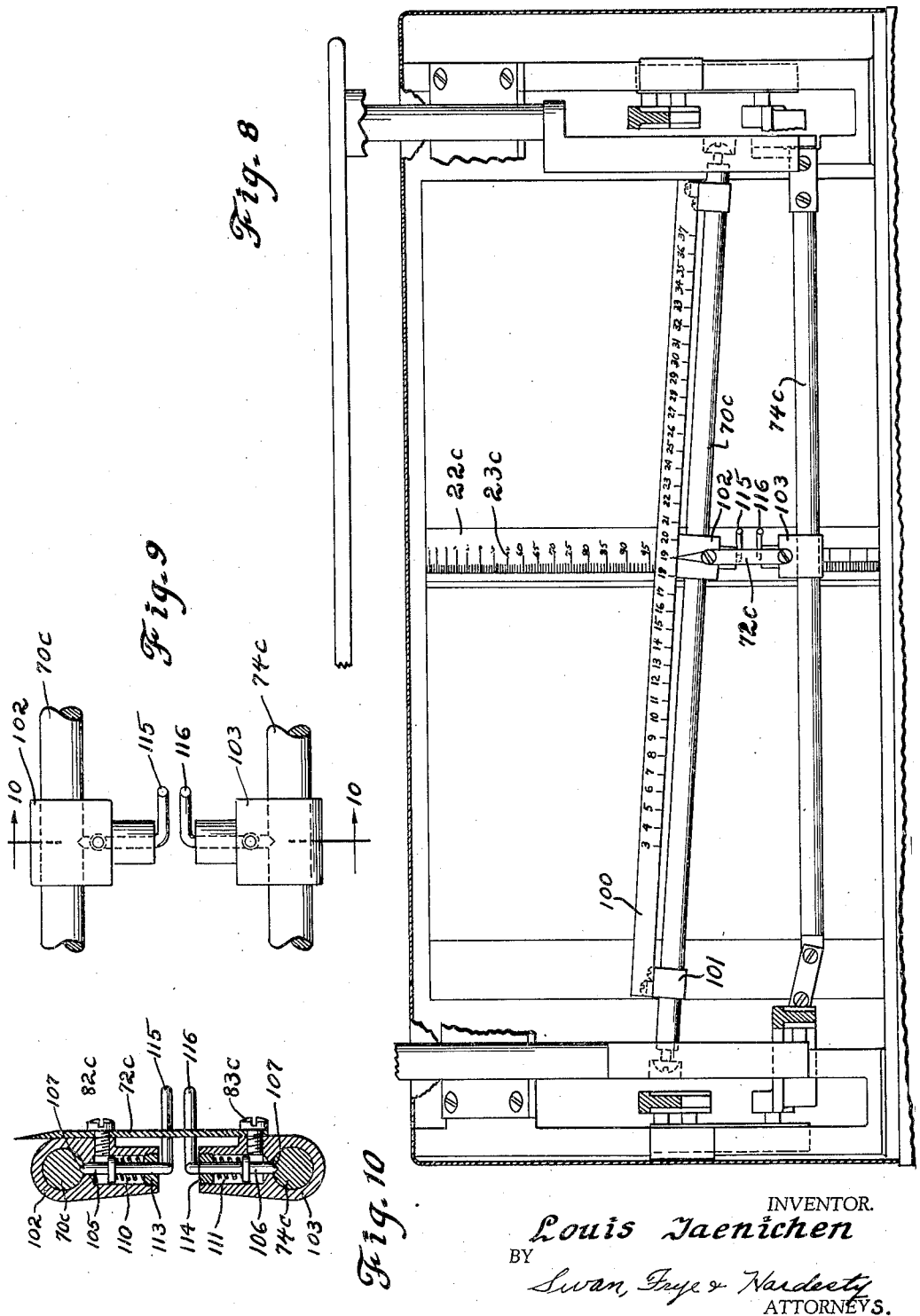

Patented Aug. 23, 1938

2,128,148

UNITED STATES PATENT OFFICE 2,128,148

WEIGHING SCALE

Louis Jaenichen, Springfield Township, Oakland County, Mich., assignor to The Standard Computing Scale Company, Detroit, Mich., a corporation of Michigan Application February 3, 1936, Serial No. 62,120

18 Claims. (Cl. 265—39)

This invention relates to weighing scales of the computing type, and more particularly to such scales of the variety incorporating a cylindrical chart arranged below the loading platform and within a simple, compact housing containing the entire scale mechanism.

An important object of the invention is the provision of a scale of the type indicated, the parts of which are interfitted in a novel and extremely compact manner, enabling the use of a small and symmetrical housing which may be of simple and pleasing contour.

Another object comprises the provision of a novel assembly incorporating levers encircling the chart, and in which the platform supporting and load counterbalancing means, and other portions of the mechanism, including the framework for the levers, chart and platform are also interfitted and evenly distributed about the chart.

A further important object lies in the provision of novel means for changing the relationship between the degree of chart actuation and load, to adapt the same scale, without changing the load counterbalancing means, to accommodate maximum loads of various sizes.

A still further object comprises the provision of novel chart actuating means for such a scale, and, in association therewith, improved thermostatic compensating means.

Another object lies in the provision of a novel assembly of levers, load counterbalancing springs and platform supporting mechanism so arranged that the platform supporting means imposes part of the load directly upon the springs, while the remainder of the load is indirectly transmitted to the springs through the lever system.

Still another object is the provision of an improved frame construction for a scale of the sort indicated, incorporating chart supporting and lever supporting portions rigidly associated but spaced from each other, while certain of the lever portions are interfitted and travel between such parts of the frame assembly.

Improved and readily accessible zero adjusting means for the chart comprises an additional object of the invention.

Other objects and advantages will be apparent from the following description, wherein reference is made to the accompanying drawings illustrating a preferred embodiment of my invention and wherein similar reference numerals designate similar parts throughout the several views.

In the drawings

Figure 3 is a horizontal section taken generally on the line 3—3 of Figure 1 and looking in the direction of the arrows.

Figure 4 is a rear elevational view of the scale, with the casing and other parts broken away to afford a better view of the mechanism.

Figure 8 is a fragmentary front view, partly broken away and similar to Figure 1, showing another somewhat modified construction.

Figure 9 is an enlarged fragmentary front elevational view of the traveling link portions, with the pointer removed.

Figure 10 is a vertical section taken as if on the line 10—10 of Figure 9, and looking in the direction of the arrows, with the pointer in place.

Figure 1:
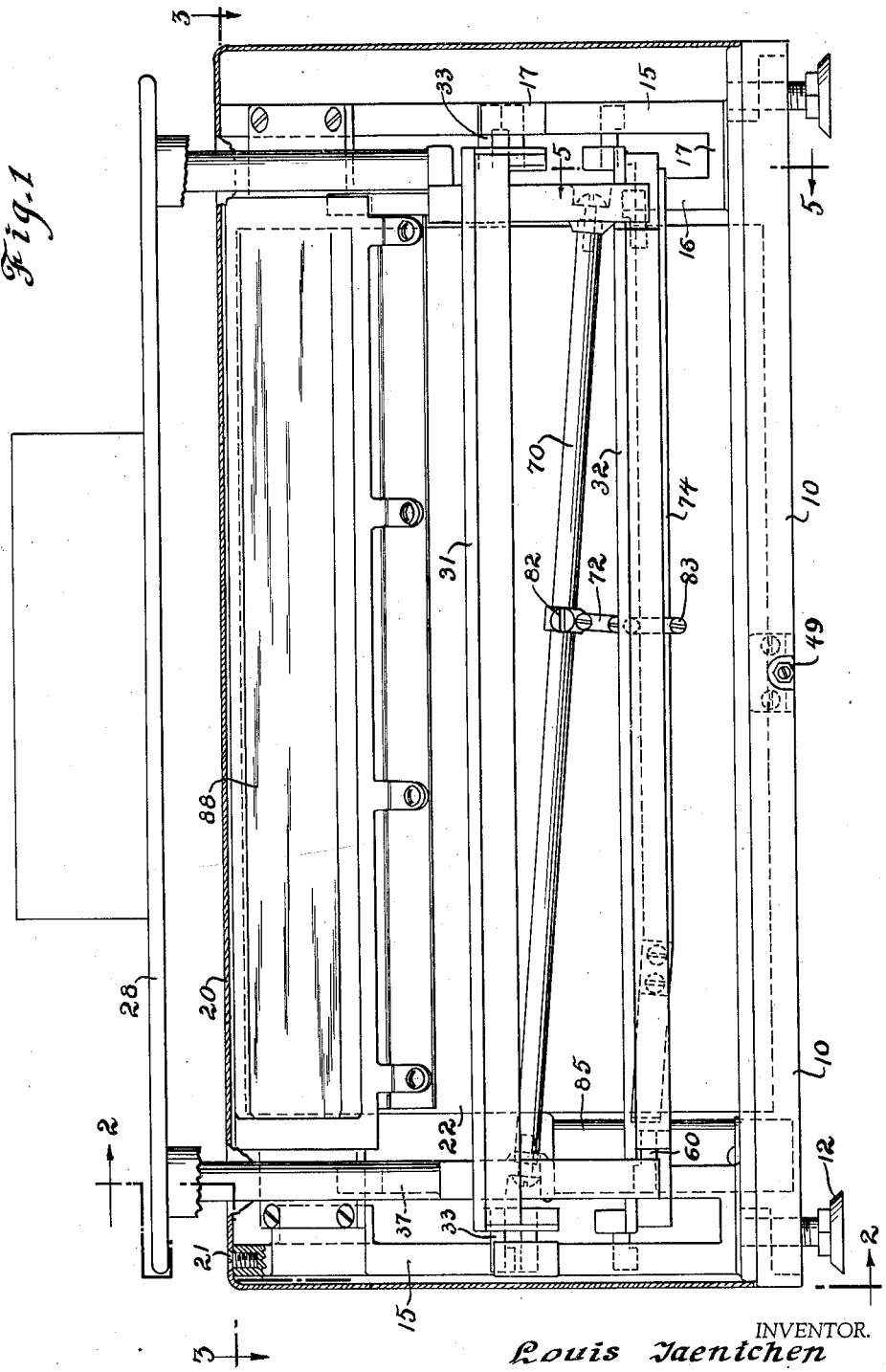
Figure 1 is a front elevational view of the scale, the casing and other parts being broken away to afford a view of the internal mechanism of the scale, which is represented as loaded to approximately half capacity.
Figure 2:
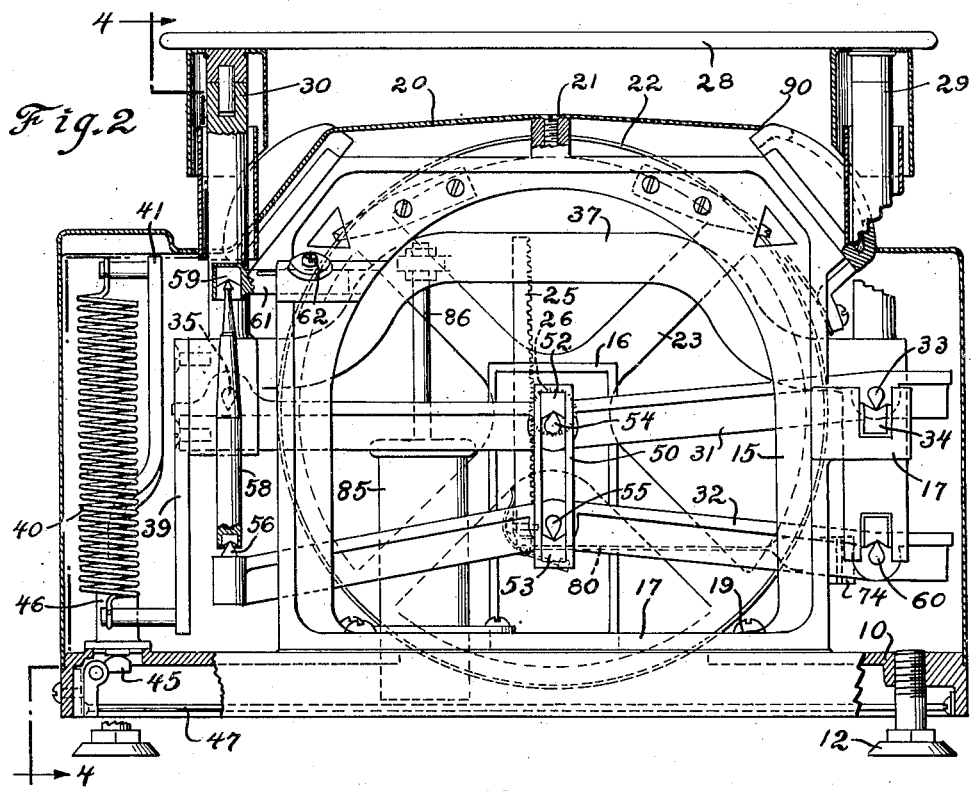
Figure 2 is a vertical section taken substantially on the line 2—2 of Figure 1 and looking in the direction of the arrows.

Referring now to the drawings, reference character 10 designates a base, indicated as of skirted, cast construction, and supported upon adjustable feet 12. The base, of rectangular form, carries near each end an upstanding generally U-shaped frame member, the bottom web 17 of which rests upon the base and is directly secured thereto as by screws 19, while spaced inner and outer upstanding arms 16—15 respectively constitute the charge supporting and lever supporting portions of the frame work. The inner, chart-carrying portions 16 are shorter and narrower, while the larger, outer portions 15, comprise the main frame elements and lie at the extreme ends of the assembly, extending the full height of the housing to support the outer casing 20, shown as an inverted box-like stamping fastened to frame portions 15 by means of screws 21.

Journaled between frame portions 16, in the usual or any suitable fashion, is a cylindrical chart 22 of the computing type, mounted as by means of spiders 23 upon a central shaft 24 driven from one and as by means of rack 25 and pinion 26.

The mechanism by which the rack and the chart are actuated will be seen to include a lever assembly comprising upper and lower main levers 31, 32, of generally rectangular outline viewed in plan, extending longitudinally about the chart, while the load-receiving platform 28 is supported by a platform frame, or spider 37, carried by the levers. The spider also encircles the chart within the housing, resting upon and traveling vertically above the levers, while the platform is supported directly above the casing upon posts, as 29—30, carried by the spider and projecting vertically through the top of the casing.

The levers are pivoted upon longitudinal axes, the upper lever 31 having a fixed axis lying in front of the chart and furnished by knife-edge pivots 33, while the lower lever 32 has an axis fixed against vertical movement lying behind the chart and furnished by pivot members 56, one of the latter, and one of the pivots 33, being arranged near each end of the scale. The other bearings for levers 31, 32 are also arranged in pairs at opposite ends of the scale. The end portions of the levers extend between frame portions 15—16. The forward, fixed pivots 33 of the upper lever rest upon bearing blocks 34 carried in forwardly projecting portions 17 provided for that purpose upon frame member 15. The rear pivots 35 carried by lever 31, also at opposite ends, bear downward upon the rear of the vertically movable platform supporting spider 37, to which are also attached the load counterbalancing springs 40 urging the spider upwardly, likewise along the back edge. Two such springs are provided, one arranged vertically at each end of the scale, in the rear corners of the casing. The lower ends of the springs are attached to arms 39 extending downwardly from the spider, while at their upper extremities the springs are held by an equalizing yoke 41 extending therebetween and supported by a post 43, to which the yoke 41 is pivotally attached, as best indicated in Figure 4, by means of a pivot pin 44. The position of the post is vertically adjustable, to provide zero indication adjustment of the chart, by means of a bellcrank 45, one arm of which bears against the bottom of the post, the latter being slidable in its support 46, and exposed at its lower end beneath the base. The other end of the bellcrank is held by a rod 47, adjustably secured as by a screw 49.

The lower lever 32 is centrally articulated to and hung from the upper lever as by means of links 50 having inwardly facing bearing blocks 52—53 engaging knife edge pivots 54—55 carried by the levers 31—32 respectively. At the rear extremity of lever 32 knife edge pivots 56 carried by the lever bear upwardly against frame member 15, the thrust being transmitted to the upper end of such frame member, as by means of rods 58 having knife edge upper extremities urged into socketed bearing elements 59 adjustably carried by and projecting from the rear of such frame members, allowing limited horizontal travel of the lever. Bearing elements 59 are shown carried by rod portions 61 slidable in and extending from the frame portions 15 near their tops, with respect to which the bearings are adjustably held in position as by means of set screws 62. At its forward edge the lever 32 supports, as by means of knife edge pivots 60, the front platform posts 29 and the front of the spider 37. The end arms of the spider, which extend from front to back of the scale, will be seen to be centrally raised to provide clearance for frame portions 16.

The front of the platform is thus carried entirely upon the front end of lever 32, the rear end of this lever being held against vertical movement, while the reverse is true of the upper lever 31, the front edge of which is provided with a fixed pivot 33, while its rear end travels vertically and carries rear platform columns 30, and so the spider and platform. A rod 70 extends between opposite ends of the spider 37, to which it is rigidly secured, and serves to actuate the indicator mechanism, through a link assembly 72 connecting the rod to an indicator actuating lever 74, to the end of which rack 25 is connected. The lever 74 extends longitudinally of the scale at the front, lying within the path of vertical travel of the front arms of levers 31—32 and pivoted near one end of the scale to one of the frame members 16, such pivotal connection being provided by means of flexible straps, as 75, although any suitable bearings or the customary scale pivots might of course be used. The straps are formed of spring metal or the like, upon the lower ends of which the lever 74 is hung, while their upper ends are attached to a supporting plate 76 carried by the frame member 15, the end of lever 74 being bent to lie parallel to and directly beneath such plate, so that the straps may be substantially flat when lever 74 is in its mean position. At its active or nose end the indicator lever carries a bimetallic thermostat 80, forming an extension thereof sufficiently rigid to support and actuate the rack 25, the thermostat being bent around the end of the chart as best shown in Figure 3, and also centrally bent at approximately 90 degrees about a longitudinal line, in order that its compensating effect may comprise two components, one tending to move the rack vertically, and the other tending to move the lower end of the rack horizontally. The link 72 is arranged to be secured to rod 70 and lever 74 at any of various positions of longitudinal adjustment therealong, set screws as 82—83 being provided to hold it in place with respect to each of these members, and it will be seen that the effective lengths of the power arm and working arm of lever 74 may thus be changed, to vary the proportionate actuation imparted to the chart by any given spring loading and deflection. Thus different charts may be fitted, provided with variant indicia, and of various capacities within the limits which the springs are able to accommodate, yet may be made to read uniformly throughout full 360 degree rotation, without requiring alterations of the counterbalancing means or lever mechanism.

A dash pot may be provided, as 85, to damp the oscillations of the parts, its plunger rod 86 being shown directly secured to the spider 37.

Windows may be provided in the casing, opening in opposite directions, one (90) at the front of the scale for reading the computing portions of the chart being fitted with a lens, as 88, extending its full length, while at the customer side or rear of the scale a shorter lens 89 may be provided to allow reading the weight indication only.

Figures 5, 6, 7:
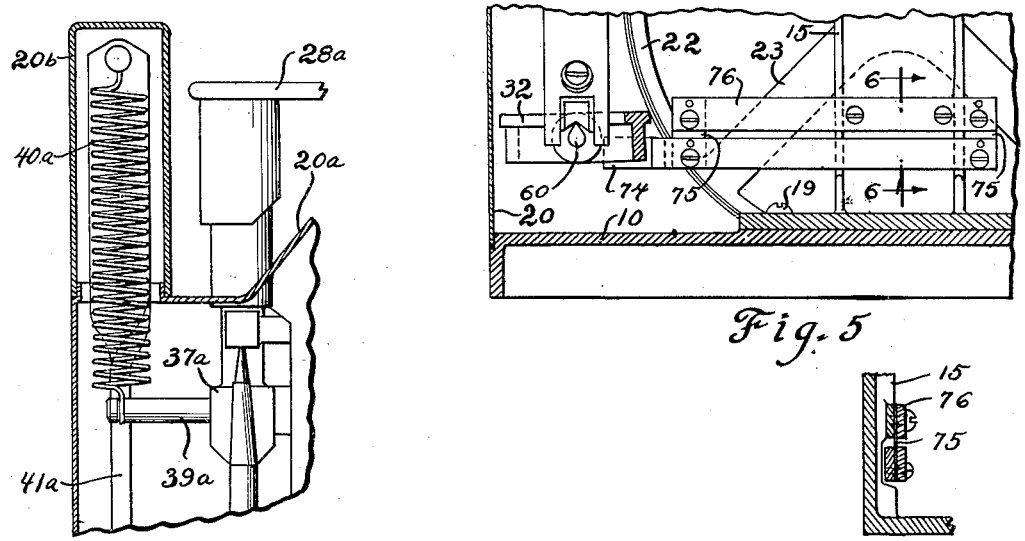
Figure 5 is a detail section taken substantially on the line 5—5 of Figure 1 and looking in the direction of the arrows.
Figure 6 is a detail section taken substantially on the line 6—6 of Figure 5 and looking in the direction of the arrows.
Figure 7 is a fragmentary vertical section of the rear portion of a scale of somewhat modified construction.

In the construction shown in Figure 7 a somewhat modified arrangement of the load counterbalancing springs will be seen to be provided. A spring holding arm 39a projects rearwardly from each back corner of the spider 37a, the lower end of one spring being directly hooked to each arm, while at their upper ends the springs are similarly attached to the tops of the laterally branching arms of an equalizing yoke 41a. Each spring, and the yoke arm to which it is attached, extends upwardly within a tubular spring housing portion 20b, one arranged near each rear corner of the casing and forming an upward extension thereof. The springs, in this construction, will be seen to extend somewhat above the platform 28a and to lie entirely above the lever system.

As indicated in Figure 8, the sliding link assembly by which the degree of chart actuation with relation to loading is determined, may be made operable by the user of the scale to proportion the chart actuation to the unit piece of weighed articles and so obtain direct price readings upon a single simple progressive chart or dial. Necessity for locating aligned portions of a pair of cooperating charts is eliminated and the price reading made much quicker and easier, while the size of the chart is greatly reduced, and the number of scales carried thereby reduced from one for each unit price on the price scale to but a single series of indicia serving for all prices.

The direct reading, total price scale 23c is carried by and suitably graduated upon the short drum 22c, and the link movement being calibrated in accordance with unit price (per pound, for example), by means of a complementary scale 100 arranged adjacent the actuating bar 70c, suitably graduated therealong, and directly mounted thereupon by means of brackets 101 upon the rod 70c. Scale 100 carries indicia representing price per unit weight, while the link 72c is extended at its top to form a pointer cooperating therewith. Slides 102, 103 are movable along rod 70c and lever rod 74c respectively, the link being articulated to the slides by means of screws as 82c, 83c. Detaining means may be carried by each slide to frictionally secure it in any set position upon its rod, such detaining means being shown as comprising detent pins 105, 106 urged against the rods, and if desired into depressions 107 formed therein at desired spaced points conforming to the indicia of scale 100. The detent springs 110, 111 and detents are housed in bores in the slides, the mentioned parts being retained in place and the outer bearing for each detent being provided by closure plugs for the bores, as 113, 114, while the detents, shown formed of wire, are extended laterally from the slides, bent around links 72c and projected forwardly adjacent one another to provide finger grip portions 115, 116, by means of which it will be seen that both detents may conveniently be retracted at once. Such grips 115, 116 may also extend through a slot (un-shown) in the front of the scale housing, to enable convenient manipulation of the slide from outside the scale.

When by pressing together the portions 115—116 the detents are released, the link assembly may be slid to a position in which the pointer designates upon scale 100 the unit price of the goods being weighed, when scale 23c will read directly the total price.

What I claim is:

1. In a weighing scale, a housing, a generally cylindrical indicator chart rotatable within the housing, a load-receiving platform arranged above the chart and housing, a lever system supporting the platform including a pair of levers within the housing each extending longitudinally around the chart and each rockable about an axis substantially parallel to that of the chart, and load counterbalancing means within the housing to resist actuation of the lever system and chart.

2. In a weighing scale, a housing, a generally cylindrical indicator chart rotatable within the housing, a load-receiving platform arranged above the chart and housing, means supporting the platform including a lever within the housing extending completely around a part of the chart and rockable about an axis substantially parallel to that of the chart, and load counterbalancing means within the housing.

3. In a weighing scale, a housing, a generally cylindrical chart rotatable within the housing, a load-receiving platform arranged above the chart and housing, means supporting the platform including a plurality of levers within the housing each having portions extending longitudinally of the chart and across the ends thereof, said levers being rockable about axes substantially parallel to and lying on opposite sides of the chart.

4. In a weighing scale, a housing, a generally cylindrical chart rotatable within the housing, a load-receiving platform arranged above the chart and housing, compound lever means supporting the platform including a pair of levers within the housing rockable about axes substantially parallel to the chart but lying on opposite sides thereof, counterbalancing means within the housing and connected to said lever system upon one side of the chart, and chart actuating means also connected to said lever system and lying upon the opposite side of the chart.

5. A weighing scale construction as set forth in claim 4 in which said chart actuating means comprises an additional lever actuable by said lever system and rockable about an axis transverse to that of the chart.

6. In a weighing scale, a housing, a generally cylindrical indicator chart rotatable therein, a load-receiving platform above the housing, load-counterbalancing means, a compound lever system within the housing supporting and movable with the platform including a pair of levers each extending around the chart, said levers being fulcrumed upon axes substantially parallel to that of the chart but outside and upon opposite sides of the same, and link means pivotally interconnecting said levers near the ends of said chart and lying within the extended cylindrical surface thereof.

7. In a weighing scale, load receiving and load counterbalancing means, one side of the load receiving means being directly supported by the load counterbalancing means, compound lever means including a lever connected to and supporting the other side of the load receiving means and movable therewith, and another lever connected to the first and also connected to and movable against the resistance of the load counterbalancing means to impose proportionately upon said load counterbalancing means loading of said other side of the load-receiving means, and indicator means actuable in response to deflection of the counterbalancing means.

8. In a weighing scale, a housing, load receiving means arranged thereabove, load counterbalancing means within the housing directly supporting one extremity of the load receiving means, a compound lever system also within the housing including a lever connected to and supporting the other end of the load receiving means, and a lever connected to the counterbalancing means to transmit to said means the loading of said other end of the load receiving means, said levers being of generally rectangular form and extending about a contained area, and indicator means comprising a substantially cylindrical chart rotatable in said area within the housing and actuable conformably to deflection of the counterbalancing means.

9. A weighing scale as set forth in claim 8 in which each of said levers extends across the ends of the chart, said levers being rockable upon axes substantially parallel to and outside the chart, and centrally articulated to each other near the ends of the chart.

10. A weighing scale as set forth in claim 8 in which each of said levers extends across the ends of said chart, said levers being rockable upon axes substantially parallel to and outside and one upon each side of the chart, and said levers being centrally articulated to each other near the ends of the chart.

11. In a weighing scale, a housing, a load-receiving platform arranged above the housing, a substantially cylindrical indicator chart rotatable about a longitudinal axis within the housing, load counterbalancing means also within the housing, lever means connected to the platform and to the chart and to the load counterbalancing means, said lever means being of substantially rectangular form and extending around the space occupied by the chart, and being rockable within the housing upon a substantially horizontal axis, and means connecting the lever means and the chart including another lever fulcrumed on axis transverse to that of said lever means.

12. In a weighing scale, a housing, a load-receiving platform arranged above the housing, a substantially cylindrical indicator chart rotatable about a longitudinal axis within the housing, load counterbalancing means also within the housing, lever means connected to the platform and to the chart and to the load counterbalancing means, said lever means being of substantially rectangular form and extending around the space occupied by the chart, and being rockable within the housing upon a substantially horizontal axis, chart actuating means connecting the lever means and the chart including another lever fulcrumed on an axis transverse to but extending in the same general direction as a portion of said first mentioned lever means, and means for connecting said last mentioned lever and said lever means at any of a plurality of points variantly spaced from the fulcrum of at least one thereof, whereby the relative movement imparted one by the other may be varied.

13. In a weighing scale, load receiving and load counterbalancing means, indicator means actuable by and conformably to loading of the scale, means connecting the indicator means and load counterbalancing means including levers pivoted upon axes transverse to each other, and means connecting said levers for transmitting motion from one to the other including a connecting member movably secured to at least one thereof for movement toward and from the fulcrum to vary the effective length of an arm of the lever.

14. In a weighing scale, load counterbalancing means, load receiving means, weight indicating means connected to and actuable with said two first mentioned means upon loading of the scale, lever means forming part of the connection between said means including a plurality of levers, one at least partially supporting the load receiving means, and another lever connected to the first between said first lever and the indicating means and not subjected to the scale loading, and strap providing a pivotal support for said last mentioned lever and holding against movement in all directions other than that of its pivotal movement.

15. In a weighing scale, load receiving and load counterbalancing means, indicator means, means connecting said indicator means to the first mentioned means for actuation thereby including a member movable to change the proportion actuation of the indicator means with relation to loading scale, means providing calibration of the position of said movable member in accordance with price per unit weight, and total price indicia carried by said indicating means.

16. In a weighing scale, load counterbalancing means, load receiving means including a support movable in a straight line under loading, one end of the support being directly supported upon and serving to actuate the load counterbalancing means, a compound lever system including a lever connected to and carrying the other end of the support and a lever connected to the load counterbalancing means and arranged to transmit to the counterbalancing means the loading of said other end of the support, said lever system being arranged around and bounding a certain area, and indicator means actuable conformably to deflection of the counterbalancing means, comprising a chart rotatable in said bounded area.

17. In a weighing scale, a housing, a generally cylindrical indicator chart rotatable therein, a load receiving platform, load counterbalancing means arranged near one side of the platform, said side of the platform being directly supported by the load counterbalancing means, lever means within the housing and also connected to the load couterbalancing means and connected to the opposite side of the platform and movable with the latter against the resistance of the counterbalancing means, whereby said lever means serves to support said opposite side of the platform and proportionately to transfer loading thereof to the counterbalancing means.

18. In a weighing scale, load counterbalancing means, load receiving means including a support movable in a straight line under loading, one side of the support being directly carried by the load counterbalancing means, including a pair of levers having oppositely disposed fixed axes and articulated intermediate their ends, one of said levers supporting the other side of the support, and the other lever being movable by the first and connected to the load counterbalancing means to proportionately transfer to the latter loading of said load receiving means, and indicator means actuable conformably to deflection of the counterbalancing means.

LOUIS JAENICHEN.